United States Patent
Faigle et al.

(10) Patent No.: US 6,273,462 B1
(45) Date of Patent: Aug. 14, 2001

(54) AIR BAG INFLATOR

(75) Inventors: Ernst M. Faigle, Dryden; Tracy S. Sparks, Lapeer; Richard J. Thompson, Imlay City, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 08/932,491

(22) Filed: Sep. 18, 1997

Related U.S. Application Data

(63) Continuation-in-part of application No. 08/532,894, filed on Sep. 22, 1995, now abandoned.

(51) Int. Cl.[7] .......................... B60R 21/26; B60R 21/28
(52) U.S. Cl. ................................. 280/737; 280/741
(58) Field of Search ........................... 280/737, 741, 280/736, 735

(56) References Cited

U.S. PATENT DOCUMENTS

| | | |
|---|---|---|
| 3,655,217 | 4/1972 | Johnson . |
| 3,721,456 | 3/1973 | McDonald . |
| 3,723,205 | 3/1973 | Scheffee . |
| 3,807,755 | 4/1974 | Mason, Jr. . |
| 3,889,703 | 6/1975 | Keathley . |
| 3,900,211 | 8/1975 | Russell et al. . |
| 5,022,674 | 6/1991 | Frantom et al. . |
| 5,031,932 | 7/1991 | Frantom et al. . |
| 5,263,740 | 11/1993 | Frey et al. . |
| 5,273,312 | 12/1993 | Coultas et al. . |
| 5,348,344 | 9/1994 | Blumenthal et al. . |
| 5,388,322 | 2/1995 | Simon . |
| 5,470,104 | * 11/1995 | Smith et al. .......................... 280/737 |
| 5,496,062 | * 3/1996 | Rink et al. ............................ 280/737 |
| 5,609,361 | * 3/1997 | Bergerson et al. ................... 280/737 |
| 5,673,934 | * 10/1997 | Saccone et al. ...................... 280/737 |
| 5,762,368 | * 6/1998 | Faigle et al. ......................... 280/737 |
| 5,782,486 | * 7/1998 | Barnes et al. ........................ 280/737 |
| 5,803,492 | * 9/1998 | Rink et al. ........................... 280/737 |
| 5,806,885 | * 9/1998 | Hock .................................... 280/737 |
| 5,836,610 | * 11/1998 | Rink et al. ........................... 280/737 |
| 5,918,900 | * 7/1999 | Ennis ................................... 280/737 |

* cited by examiner

*Primary Examiner*—Lanna Mai
*Assistant Examiner*—Jeff Restifo
(74) *Attorney, Agent, or Firm*—Tarolli, Sundheim, Covell, Tummino & Szabo L.L.P.

(57) ABSTRACT

An apparatus (10) for inflating an inflatable device (8) includes a container (12) defining a chamber (14) containing gas. The container (12) includes a rupturable wall (24) which is rupturable when the pressure in the container reaches a predetermined level. An igniter (46) spaced from the rupturable wall (24) produces a shock wave in the gas which ruptures the rupturable wall (24) prior to the gas pressure in the container (12) reaching the predetermined level.

12 Claims, 2 Drawing Sheets

AIR BAG INFLATOR

This application is a continuation-in-part of application Ser. No. 08/532,894 filed on Sep. 22, 1995 now abandoned.

BACKGROUND OF THE INVENTION

The present invention relates to an inflator for inflating an inflatable device, such as an air bag of a vehicle occupant restraint system. More specifically, the present invention relates to an inflator including a container defining a chamber in which gas under pressure is stored and having a rupturable wall that ruptures to provide a gas exit.

U.S. Pat. No. 3,723,205 discloses an inflator for inflating an air bag including a container which contains gas under pressure and a gas generating solid material. When the air bag is to be inflated, a squib is actuated to ignite the gas generating solid material in the container. As the gas generating solid material is burned, the pressure in the container is increased by the heat resulting from combustion of the gas generating solid material. When a predetermined pressure is reached, a rupture disk is ruptured to enable gas to flow from the container to the air bag.

Another inflator for inflating an air bag is disclosed in U.S. Pat. No. 5,273,312. The inflator disclosed in U.S. Pat. No. 5,273,312 includes a container which contains a gas under pressure and a gas generating solid material. The container is closed by a rupture disk. A pyrotechnic charge, when ignited, generates pressure against a head of a piston to move the piston. The moving piston ruptures the rupture disk to release a flow of gas from the container. The ignited pyrotechnic charge also generates combustion products which are conducted to the gas generating solid material through a passage that extends through the piston. The combustion products ignite the gas generating solid material which then produces gas and heat that increase the pressure in the container. The pressurized gas flows from the container to the air bag to inflate the air bag.

An inflator disclosed in U.S. Pat. No. 5,263,740 includes a container which contains a gas under pressure. The container is closed by a rupture disk. An igniter is located outside the container directly adjacent the rupture disk, and when ignited produces a pressure wave that ruptures the disk.

SUMMARY OF THE INVENTION

The present invention is a new inflator for inflating an inflatable device, such as an air bag, of a vehicle occupant restraint system. The inflator includes a container defining a chamber containing gas. The container includes a rupturable wall which is rupturable when the pressure in the container reaches a predetermined level. The inflator also includes means for producing a shock wave in the gas which ruptures the rupturable wall prior to the gas pressure in the container reaching the predetermined level.

The pressure required to rupture the rupturable wall of the present invention is sufficiently larger than the pressure in the container so that the rupturable wall of the present invention will not rupture due to a slight increase in pressure of the stored gas.

Preferably, the means for producing the shock wave in the gas is an igniter. The igniter, when ignited, produces the shock wave. The igniter is spaced away from the rupturable wall, and the shock wave produced by the igniter is transmitted through the gas and strikes the rupturable wall with sufficient energy to rupture the rupturable wall. The igniter increases the pressure of the stored gas to a level less than the pressure required to rupture the rupturable wall while providing the shock wave which ruptures the rupturable wall.

BRIEF DESCRIPTION OF THE DRAWINGS

The foregoing and other features of the present invention will become apparent to one skilled in the art upon reading the following description of the present invention with reference to the accompanying drawings, wherein.

DESCRIPTION OF THE PREFERRED EMBODIMENTS

Figure 1:
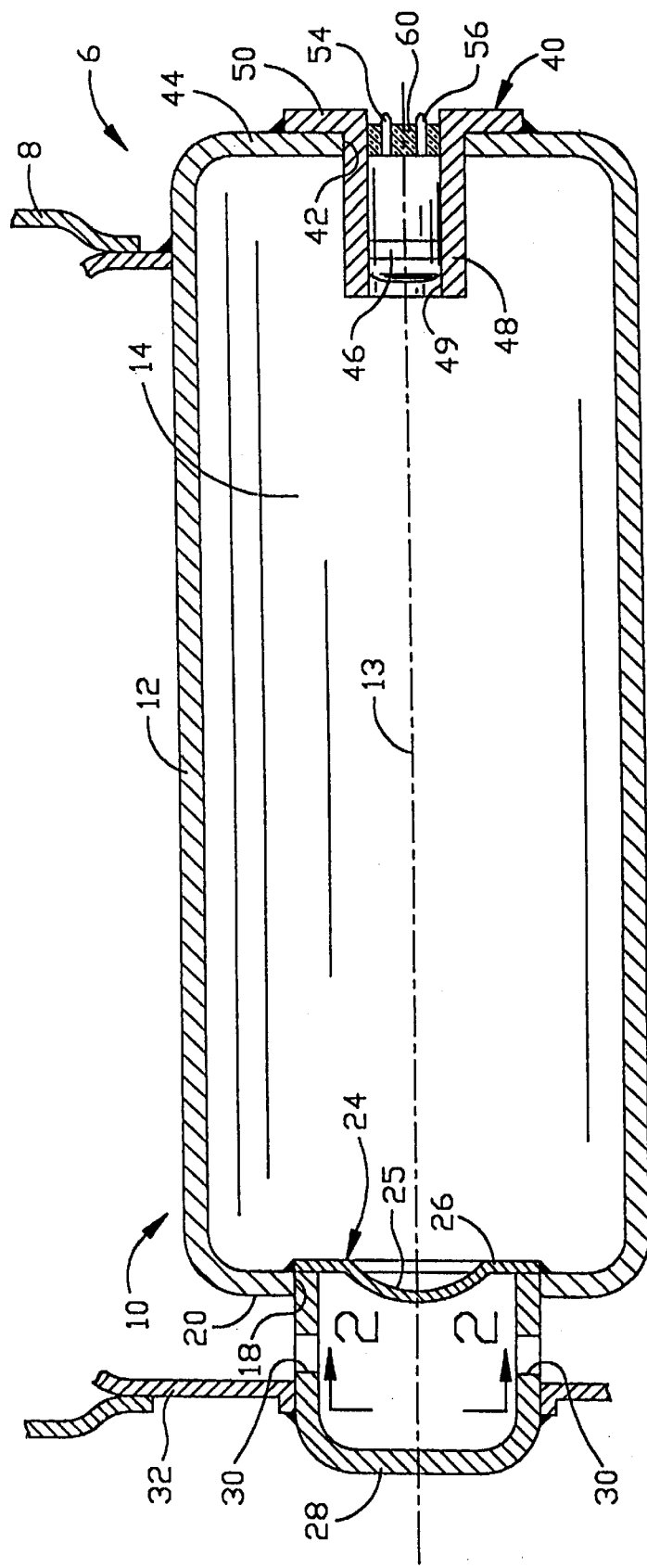
FIG. 1 is a schematic sectional view of an inflator constructed in accordance with the present invention.

An occupant restraint system 6 (FIG. 1) includes a particular type of inflatable vehicle occupant restraint known as an air bag 8, a portion of which is shown in FIG. 1, and an inflator 10. The inflator 10 is operable to inflate the air bag 8 of the vehicle occupant restraint system 6. The air bag 8 is inflated in response to vehicle deceleration indicative of a collision requiring air bag deployment. The air bag 8, when inflated, helps protect the vehicle occupant from forcibly striking parts of the vehicle interior. The air bag 8 and the inflator 10 may be located in a vehicle seat, a vehicle door, a vehicle instrument panel, a vehicle steering wheel, or in any other location in which it is desired to place an inflator.

The inflator 10 includes a metal cylindrical container 12 having a longitudinal axis 13. The container 12 defines a chamber 14 containing a gas under pressure. Preferably, the gas is an inert gas, such as nitrogen or argon or a mixture of nitrogen and argon. Also, other gases may be used, such as a combustible mixture of gases including hydrogen, oxygen, and an inert gas. The pressure of the gas in the container 12 may vary but typically is 3,000 psi to 4,500 psi at room temperature. The container 12 has a circular opening 18 defining an exit for the gas in one axial end portion 20 of the container. The container 12 may have any desired shape including a toroidal configuration.

The opening 18 is closed by a metal burst disk 24. The burst disk 24 has a domed central portion 25 and a radially extending portion 26 affixed to the end portion 20 of the container 12. The burst disk 24 is shown welded to the container 12. However, the burst disk may be connected to the container in any known manner, including by clamping. The burst disk 24 has sufficient strength to withstand the pressure of the stored gas in the container 12 including any rise in pressure due to storage temperatures. The burst disk 24 is rupturable when the pressure in the container 12 reaches a predetermined level. Preferably, the burst disk 24 is rupturable when the pressure in the container 12 reaches a predetermined level of 5,000 psi. Also, a safety factor may be used in determining the strength of the burst disk 24.

A manifold 28 is connected to the end portion 20 of the container 12. The manifold 28 includes a plurality of radially extending openings 30 for directing gas passing through the opening 18 from the chamber 14. The manifold 28 directs gas in equal and opposite radial directions to provide thrust neutrality. A canister 32, a portion of which is shown in FIG. 1, surrounds the container 12 and the manifold 28. The air bag 8 is connected to the canister 32.

An igniter housing 40 extends through an opening 42 in the other axial end portion 44 of the container 12 and supports a detonator or an igniter 46. The igniter housing 40 supports the igniter so that the igniter is directed toward the axial end portion 20 of the container 12 and the burst disk 24 and is spaced at least 25 mm from the burst disk. A longitudinal axis of the igniter 46 extends toward the burst disk and is preferably coaxial with the central axis of the burst disk 24 and the longitudinal axis 13 of the container 12. The longitudinal axis of the igniter 46 may be offset from the axis 13 of the container 12 and extend parallel to the axis 13.

The igniter housing 40 includes a cylindrical portion 48 with an axially extending central passage 49. The igniter 46 is located in the passage 49. A radially extending portion 50 of the igniter housing 40, which extends from an end of the cylindrical portion 48, is welded to the end portion 44 of the container 12. Although the igniter housing 40 is shown welded to the container 12, the igniter housing may be connected in any known manner, such as by clamping.

The igniter 46 is of any construction and typically includes lead wires 54 and 56 for connecting the igniter to a firing circuit (not shown) and a glass-to-metal seal 60 (or other means to prevent leaks) interconnects the housing 40 and the igniter 46. The seal 60 is a glass-like ceramic material which seals around and fuses to the housing 40, the igniter 46 and the lead wires 54 and 56 of the igniter 46. The glass seal 60 completely spans the passage 49 in the housing 40 and provides a fluid tight seal between the igniter 46 and the housing 40.

Figure 3:
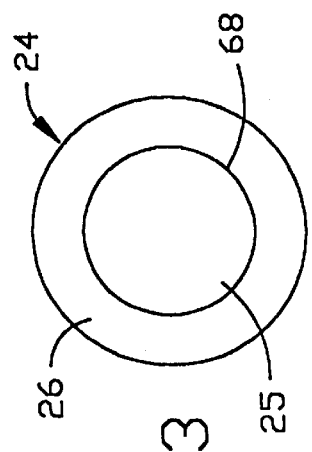
FIG. 3 is a plan view of a second embodiment of a burst disk, generally similar to FIG. 2.
Figure 2:
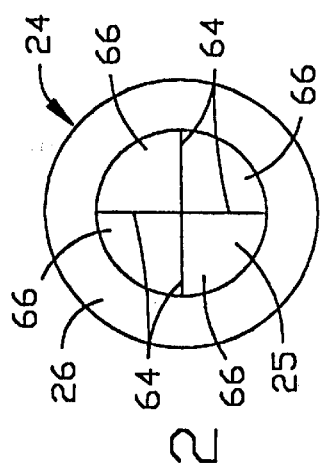
FIG. 2 is a plan view of a first embodiment of a burst disk of the inflator of FIG. 1, taken generally along the line 2—2 of FIG. 1.

The burst disk 24 (FIG. 2) may be scored along the domed portion 25 to define a plurality of radially extending weakened portions 64. The radially extending weakened portions 64 define pie-shaped pieces 66 of the domed portion 25. The burst disk 24 ruptures along the weakened portions 64 and the pie-shaped pieces 66 remain connected to the burst disk. In another embodiment of the burst disk 24, shown in FIG. 3, the burst disk is scored along an edge defined between the domed portion 25 and the radially extending portion 26 to define a circular-shaped weakened portion 68. The domed portion 25 separates from the burst disk 24 in response to actuation of the igniter 46. The burst disk 24 may be of any suitable construction.

Upon the occurrence of sudden vehicle deceleration indicative of a collision requiring inflation of the air bag 8, a deceleration sensor (not shown), of any known and suitable construction, completes an electrical circuit to activate the igniter 46. The igniter 46 produces a shock wave in the gas in the chamber 14 and increases the pressure in the container to a first level less than the predetermined level at which the burst disk 24 ruptures. The shock wave propagates toward the burst disk 24 and increases the pressure of the gas in the container 12 in localized areas to a second level greater than the first level.

The kinetic energy of the shock wave impulse causes the burst disk 24 to rupture prior to the pressure in the container 12 reaching the predetermined level at which the burst disk 24 would rupture. The shock wave ruptures the burst disk 24 along the weakened portions 64 or 68 to release the gas stored in the container 12. The gas stored in the container 12 flows through the opening 18 in the axial end 20 of the container 12 and into the manifold 28. The gas then flows through the radially extending openings 30 in the manifold 28 to the air bag 8.

An inflator constructed in accordance with the present invention was activated and monitored for pressure in the container over a period of time. The inflator had a burst disk that was designed to rupture when the pressure in the inflator reached a predetermined level of 5,000 psi. The container was pressurized to an initial level of 1054 psi, as can be seen at time 0 on the graph in FIG. 4.

Figure 4:
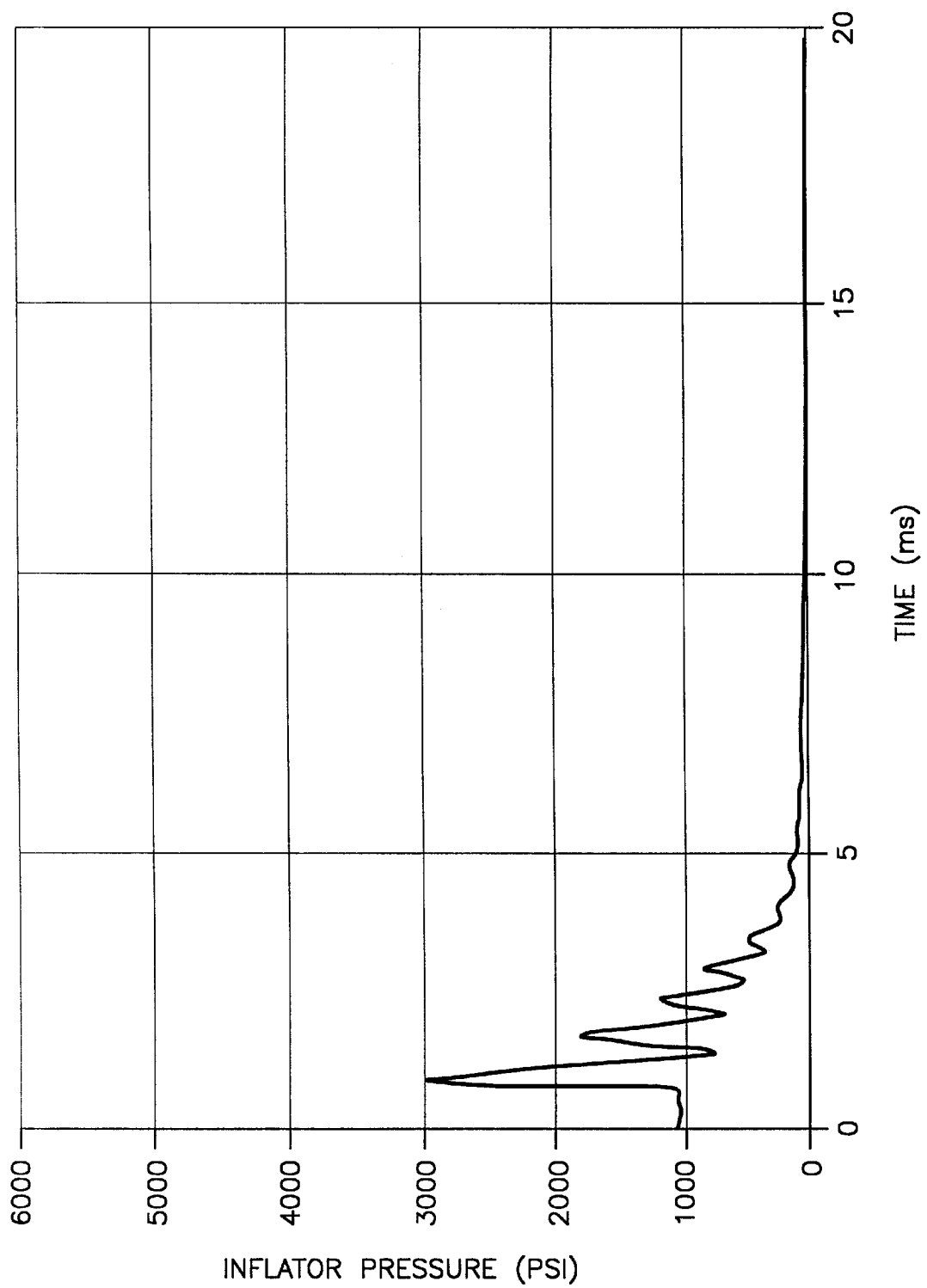
FIG. 4 is a graph of inflator pressure vs. time for the activation of an inflator made in accordance with the present invention.

The igniter was activated. The igniter produced a shock wave in the gas in the container and increased the pressure in the container. The pressure in the container reached a maximum second level of 2983.1 psi at 1 ms, as can be seen in FIG. 4. The burst disk ruptured when the pressure in the container reached the second level which was much less than the predetermined level of 5,000 psi.

From the above description of the invention, those skilled in the art will perceive improvements, changes and modifications. For example, the inflatable vehicle occupant restraint could be an inflatable seat belt, rather than an air bag. Such improvements, changes and modifications within the skill of the art are intended to be covered by the appended claims.

Having described the invention, the following is claimed:

1. An apparatus comprising:
   an inflatable vehicle occupant restraint for helping to protect a vehicle occupant in the event of a collision;
   an inflator for providing inflation fluid for inflating said vehicle occupant restraint, said inflator comprising:
   a container defining a chamber containing gas for inflating said vehicle occupant restraint, said container having a rupturable wall which is rupturable when the gas pressure in said container reaches a predetermined gas pressure and is rupturable by a shock wave, and
   and igniter for increasing the gas pressure and for producing a shock wave in said gas, said shock wave rupturing said rupturable wall prior to said gas pressure in said container reaching said predetermined gas pressure.

2. Apparatus as defined in claim 1 wherein said igniter is spaced from said rupturable wall and at least partially exposed to said chamber, said igniter, when ignited, producing said shock wave which is transmitted through said gas in said chamber to said rupturable wall.

3. Apparatus as set forth in claim 2 further including a seal between said igniter and said container.

4. Apparatus as set forth in claim 1 wherein said igniter is spaced at least 25 mm from said rupturable wall.

5. Apparatus as set forth in claim 1 wherein said container is generally cylindrical and has first and second axial end portions, said rupturable wall being located at said first axial end portion of said container and said igniter being located at said second axial end portion of said container.

6. Apparatus as set forth in claim 5 wherein said rupturable wall includes a burst disk fixedly connected to said first axial end portion of said container, said igniter being connected to said second axial end portion of said container and located within said container.

7. Apparatus as set forth in claim 6 wherein said igniter has a longitudinal axis extending parallel to an axis of said burst disk.

8. Apparatus as set forth in claim 6 wherein said igniter has a longitudinal axis extending along an axis of said burst disk.

9. Apparatus as set forth in claim 1 wherein said rupturable wall includes at least one weakened portion along which said rupturable wall ruptures.

10. Apparatus as set forth in claim 9 wherein said rupturable wall includes a plurality of radially extending weakened portions.

11. Apparatus as set forth in claim 9 wherein said rupturable wall includes a circular shaped weakened portion.

12. An apparatus comprising:

an inflatable vehicle occupant restraint for helping to protect a vehicle occupant in the event of a collision;

an inflator for providing inflation fluid for inflating said vehicle occupant restraint, said inflator comprising:

a container defining a chamber containing gas for inflating said vehicle occupant restraint, said container having a rupturable wall which is rupturable when the gas pressure in said container reaches a predetermined gas pressure and is rupturable by a shock wave, and a detonator for increasing the gas pressure and for producing a shock wave in said gas, said shock wave rupturing said rupturable wall prior to said gas pressure in said container reaching said predetermined gas pressure.

* * * * *